United States Patent
Nitta et al.

(10) Patent No.: US 8,303,267 B2
(45) Date of Patent: Nov. 6, 2012

(54) LIQUID COOLING UNIT AND ELECTRONIC APPARATUS

(75) Inventors: Kazuhiro Nitta, Kawasaki (JP); Masumi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/656,532

(22) Filed: Feb. 2, 2010

(65) Prior Publication Data
US 2010/0142148 A1    Jun. 10, 2010

Related U.S. Application Data

(63) Continuation of application No. PCT/JP2007/067839, filed on Sep. 13, 2007.

(51) Int. Cl.
*F04B 17/03* (2006.01)
*F04B 35/04* (2006.01)
*G06F 1/20* (2006.01)
*H05K 7/20* (2006.01)

(52) U.S. Cl. ............ 417/360; 417/363; 361/679.53; 361/699

(58) Field of Classification Search ............ 248/68.1; 417/360, 363, 413.1, 413.2; 361/679.53, 361/699, 701, 702, 703; 165/80.4–80.5, 165/104.33; 257/714; 174/15.1
See application file for complete search history.

(56) References Cited

U.S. PATENT DOCUMENTS

| | | | |
|---|---|---|---|
| 6,173,926 B1* | 1/2001 | Elvegaard | 248/74.1 |
| 6,611,425 B2* | 8/2003 | Ohashi et al. | 361/679.52 |
| 6,845,011 B2* | 1/2005 | Tomioka et al. | 361/699 |
| 6,950,303 B2 | 9/2005 | Neho et al. | |
| 7,387,282 B2* | 6/2008 | Kovac | 248/74.4 |
| 2004/0070940 A1 | 4/2004 | Tomioka et al. | |

FOREIGN PATENT DOCUMENTS

| | | |
|---|---|---|
| JP | 5-340375 | 12/1993 |
| JP | 2003-139453 | 5/2003 |
| JP | 2004-102949 | 4/2004 |
| JP | 2004-139187 | 5/2004 |
| TW | 592027 B | 6/2004 |

OTHER PUBLICATIONS

International Search Report for PCT/JP2007/067839, mailed Oct. 16, 2007.
English Translation of the International Preliminary Report on Patentability mailed Apr. 15, 2010 in corresponding International Patent Application PCT/JP2007/067839.
TW 592027 B (Reference AG) was cited in a Taiwanese Office Action (Reference BE) issued Aug. 23, 2010 in corresponding Taiwanese Patent Application 096134205.
US 6,950,303 B2 (Reference AA) corresponds to TW 592027 B (Reference AG).
Taiwanese Office Action issued Aug. 23, 2010 in corresponding Taiwanese Patent Application 096134205.

* cited by examiner

*Primary Examiner* — Devon Kramer
*Assistant Examiner* — Bryan Lettman
(74) *Attorney, Agent, or Firm* — Staas & Halsey LLP (57) ABSTRACT

A liquid cooling unit includes a pump body. A nipple is formed in the pump body. The nipple defines an outflow passage for coolant. An elastic tube has the tip end receiving insertion of the nipple so that the elastic tube is coupled to the nipple. A fixation member defines a groove supporting the nipple inside the elastic tube over a first predetermined length from the tip end of the nipple. The groove receives the elastic tube alone ahead of the tip end of the nipple over a second predetermined length from the tip end of the nipple.

20 Claims, 9 Drawing Sheets

LIQUID COOLING UNIT AND ELECTRONIC APPARATUS

CROSS-REFERENCE TO RELATED APPLICATION

This application is a continuing application, filed under 35 U.S.C. §111(a), of International Application PCT/JP2007/067839, filed Sep. 13, 2007, the contents of which are incorporated herein by reference.

FIELD

The embodiments discussed herein are related to a liquid cooling unit incorporated in an electronic apparatus such as a notebook personal computer, for example.

BACKGROUND

A liquid cooling unit is well known as disclosed in the Japanese Patent Application Laid-open No. 2004-139187, for example. The liquid cooling unit employs a centrifugal or a vortex pump operating based on the rotation of a rotor.
Patent Publication 1:
JP Patent Application Laid-open No. 5-340375
Patent Publication 2:
JP Patent Application Laid-open No. 2004-139187

A piston pump employing a piston and a piezoelectric pump employing a piezoelectric element are well known. The piston and piezoelectric pumps enables an efficient circulation of coolant as compared with the centrifugal and vortex pumps. On the other hand, a large pulsation is generated in the piston and piezoelectric pumps. If an elastic tube or tubes such as a rubber tube or tubes are connected to the piston and piezoelectric pumps, the pulsation causes vibration of the tube or tubes. In the case of a notebook personal computer, for example, the vibration of the tube or tubes is transferred to the hands of a user through a palm rest. The user feels uncomfortable with the notebook personal computer. A rigid piping can be employed so as to avoid the vibration resulting from the pulsation. However, the rigid piping requires a high accuracy in positioning the components of the liquid cooling unit. This leads to a troublesome assembling operation and a higher production cost.

SUMMARY

It is accordingly an object in one aspect of the embodiments to provide a liquid cooling unit contributing to the minimization of vibrations which a pump generates. It is also an object in one aspect of the embodiments to provide an electronic apparatus including such a liquid cooling unit.

According to a first aspect of the invention, a liquid cooling unit includes: a pump body; a nipple formed in the pump body, the nipple defining an outflow passage for coolant; an elastic tube having the tip end receiving insertion of the nipple so that the elastic tube is coupled to the nipple; and a fixation member defining a groove supporting the nipple inside the elastic tube over a first predetermined length from the tip end of the nipple, the groove receiving the elastic tube alone ahead of the tip end of the nipple over a second predetermined length from the tip end of the nipple.

According to a second aspect of the invention, a liquid cooling unit includes: a pump body; an inflow nipple formed in the pump body, the inflow nipple defining an inflow passage for coolant; an outflow nipple formed in the pump body in parallel with the inflow nipple, the outflow nipple defining an outflow passage for coolant; a first elastic tube having the tip end receiving insertion of the inflow nipple so that the first elastic tube is coupled to the inflow nipple; a second elastic tube having the tip end receiving insertion of the outflow nipple so that the second elastic tube is coupled to the outflow nipple; and a fixation member defining a first groove and a second groove, the first groove supporting the inflow nipple inside the first elastic tube over a first predetermined length from the tip end of the inflow nipple, the first groove receiving the first elastic tube alone ahead of the tip end of the inflow nipple over a second predetermined length from the tip end of the inflow nipple, the second groove supporting the outflow nipple inside the second elastic tube over a third predetermined length from the tip end of the outflow nipple, the second groove receiving the second elastic tube alone ahead of the tip end of the outflow nipple over a fourth predetermined length from the tip end of the outflow nipple.

The object and advantages of the embodiments will be realized and attained by means of the elements and combinations particularly pointed out in the appended claims. It is to be understood that both the foregoing general description and the following detailed description are exemplary and explanatory and are not restrictive of the embodiments, as claimed.

DESCRIPTION OF EMBODIMENT

Embodiments of the present invention will be explained below with reference to the accompanying drawings.

Figure 1:
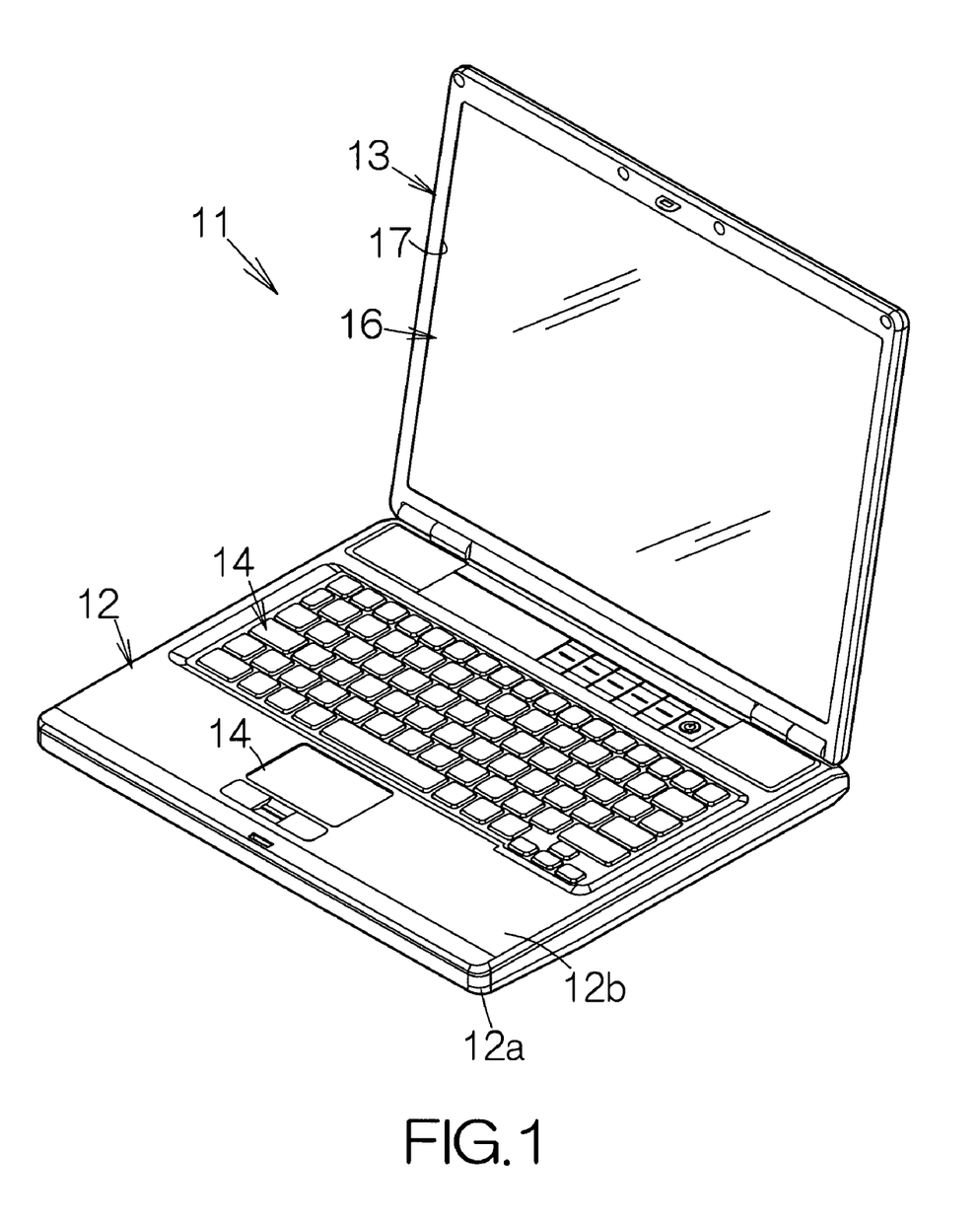
FIG. 1 is a view schematically depicting a notebook personal computer as a specific example of an electronic apparatus according to an embodiment of the present invention.

FIG. 1 schematically illustrates a notebook personal computer 11 as a specific example of an electronic apparatus according to a first embodiment of the present invention. The notebook personal computer 11 includes a thin first enclosure, namely a main body enclosure 12. A second enclosure, namely a display enclosure 13, is coupled to the main body enclosure 12 for relative swinging movement. The main body enclosure 12 includes a base 12a. A cover 12b is removably coupled to the base 12a. The display enclosure 13 can be superposed on the main body enclosure 12 through the swinging movement relative to the main body enclosure 12. The main body enclosure 12 and the display enclosure 13 are made of a reinforced resin material, for example.

Input devices 14, such as a keyboard and a pointing device, are embedded in the surface of the main body enclosure 12. Users manipulate the input devices 14 to input commands and data. A liquid crystal display (LCD) panel module 16 is enclosed in the display enclosure 13, for example. The screen of the LCD panel module 16 is exposed in a window opening 17 defined in the display enclosure 13. Texts and graphics appear on the screen. Users can see the ongoing operation of the notebook personal computer 11 based on the texts and graphics on the screen.

Figure 2:
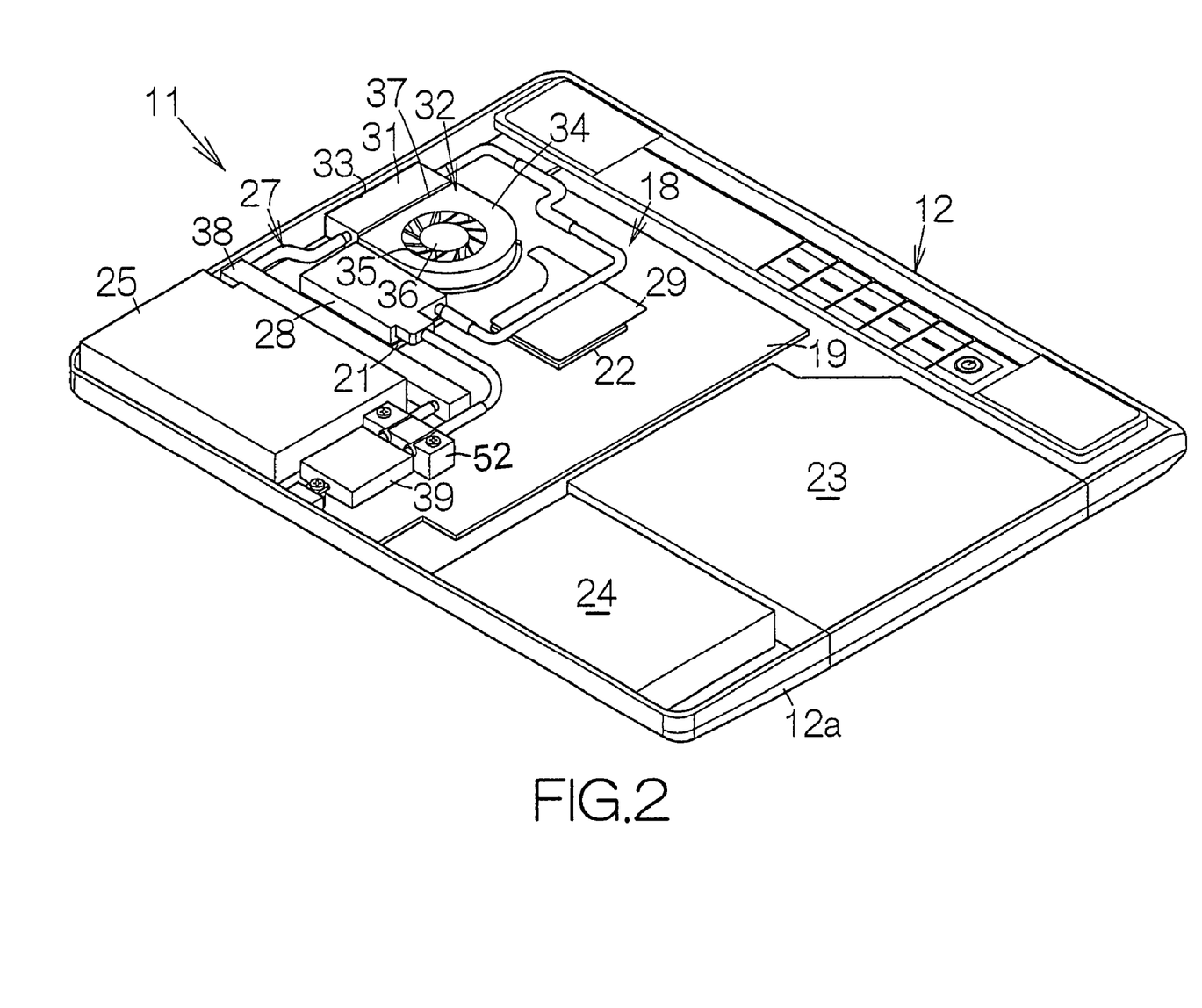
FIG. 2 is a perspective view schematically depicting the inner structure of the notebook personal computer.

As depicted in FIG. 2, a printed circuit board unit 18 is placed in the inner space defined in the main body enclosure 12. The printed circuit board unit 18 includes a printed wiring board 19 and electronic components, namely first and second large-scale integrated circuit (LSI) packages 21, 22, mounted on the front surface of the printed wiring board 19. The first LSI package 21 includes a central processing unit (CPU) chip, not depicted, mounted on a small-sized substrate, for example. The second LSI package 22 includes a video chip and a chip set, not depicted, mounted on a small-sized substrate, for example. The chip set includes a peripheral circuit of the CPU, for example. The CPU chip is configured to execute various kinds of processing based on an operating system (OS) and application software, for example. The video chip is configured to execute image processing based on the processing of the CPU chip, for example.

Storage medium drives or storage devices, such as a digital versatile disk (DVD) drive 23 and a hard disk drive, HDD, 24, are placed in the inner space of the main body enclosure 12 at a position outside the printed wiring board 19. The aforementioned operating system and application software may be stored in the hard disk drive 24. A card unit 25 is placed in the inner space of the main body enclosure 12. A PC card, such as a memory card, a small computer system interface (SCSI) card and a local area network (LAN) card, is inserted into the card unit 25 through a card slot. The card unit 25 may be mounted on the printed wiring board 19, for example.

A liquid cooling unit 27 is placed on the printed wiring board 19 in the inner space of the main body enclosure 12. The liquid cooling unit 27 includes a first heat receiver 28, in the form of a box, received on the first LSI package 21. Screws may be utilized to fix the first heat receiver 28 onto the printed wiring board 19, for example. The first heat receiver 28 is made of a metallic material having thermal conductivity, such as aluminum, for example. The heat of the CPU chip is transferred to the first heat receiver 28. The first heat receiver 28 thus absorbs the heat of the CPU chip. A flow passage for coolant is defined in the inner space of the heat receiver 28. The liquid cooling unit 27 allows establishment of a closed circulating loop for coolant. The first heat receiver 28 is inserted in the closed circulating loop. Here, antifreeze of propylene glycol series may be utilized as coolant, for example.

A second heat receiver 29 is inserted in the closed circulating loop. The second heat receiver 29 is received on the second LSI package 22. The second heat receiver 29 is connected to the first heat receiver 28 at a position downstream of the first heat receiver 28. The second heat receiver 29 includes a thermal conductive plate received on the video chip. A metallic pipe is coupled to the thermal conductive plate. The metallic pipe will be described later in detail. Coolant flows through the metallic pipe. Screws may be utilized to fix the thermal conductive plate onto the printed wiring board 19, for example. The thermal conductive plate may be made of a metallic material having thermal conductivity, such as aluminum, for example. The heat of the video chip is transferred to the thermal conductive plate. The second heat receiver 29 thus absorbs the heat of the video chip.

A heat exchanger 31 is inserted in the closed circulating loop. The heat exchanger 31 is configured to absorb heat from the coolant. The heat exchanger 31 is connected to the second heat receiver 29 at a position downstream of the second heat receiver 29. The ventilation opening of a fan unit 32 is opposed to the heat exchanger 31. Screws may be utilized to fix the heat exchanger 31 and the fan unit 32 onto the printed wiring board 19, for example. The heat exchanger 31 is located between the fan unit 32 and an air outlet 33 defined in the main body enclosure 12.

The fan unit 32 includes a fan housing 34. The fan housing 34 defines a predetermined inner space. The air suction opening 35 is formed in each of the top and bottom plates of the fan housing 34. The inner space of the fan housing 34 is spatially connected to a space outside the fan housing 34 through the air suction openings 35. A fan 36 is placed in the inner space of the fan housing 34. The fan 36 has the structure of a so-called centrifugal fan. When the fan 36 is driven for rotation, fresh air is sucked through the air suction openings 35, 35 of the bottom and top plates of the fan housing 34. The rotation of the fan 36 serves to generate airflow running in the centrifugal direction.

A ventilation opening 37 is defined in the fan housing 34 at a position outside the fan 36 in the centrifugal direction of the fan 36. The heat exchanger 31 is placed between the ventilation opening 37 and the air outlet 33. The centrifugal airflow is guided to the ventilation opening 37 along the inner surface of the fan housing 34. The air is discharged from the ventilation opening 37. The discharged air passes through the heat exchanger 31 and reaches the air outlet 33. The heat exchanger 31 includes parallel heat radiating fins, not depicted, arranged in the direction perpendicular to the direction of the airflow. An airflow passage is defined between the adjacent ones of the heat radiating fins. The parallel heat radiating fins stand upright from the outer surface of the metallic pipe defining a flow passage for coolant. The heat of the coolant is transferred to the heat radiating fins in this manner. The heat radiating fins are made of a metallic material having thermal conductivity, such as aluminum, for example.

A tank 38 is inserted in the closed circulating loop. The tank 38 is connected to the heat exchanger 31 at a position downstream of the heat exchanger 31. The tank 38 is made of a metallic material having thermal conductivity, such as aluminum, for example. Screws may be utilized to fix the tank 38 onto the printed wiring board 19, for example. The tank 38 serves to store coolant and air in the closed circulating loop. The coolant and air are kept in a storage space defined in the tank 38. A coolant outlet is defined in the storage space. The coolant outlet is located at a position closest to the bottom of the storage space. Even if the amount of the coolant reduces in the closed circulating loop because of evaporation, for example, the gravity makes the coolant kept on the bottom of the storage space. Air is prevented from entering the coolant outlet. Only the coolant is allowed to flow into the coolant outlet.

A pump 39 is inserted in the closed circulating loop. The pump 39 is connected to the tank 38 at a position downstream of the tank 38. The first heat receiver 28 is connected to the pump 39 at a position downstream of the pump 39. A piezoelectric pump may be utilized as the pump 39, for example. A piezoelectric element is incorporated in the piezoelectric pump. When the piezoelectric element vibrates in response to the application of an electric field, the coolant is supplied to the pump 39 from the tank 38 in response to the oscillating motion, as described later in detail. Likewise, the coolant is discharged from the pump 39 to the first heat receiver 28 based on the oscillating motion of the piezoelectric element. The pump 39 causes the circulation of the coolant through the closed circulating loop in this manner. Description will be made on the pump 39 later in detail.

Figure 3:
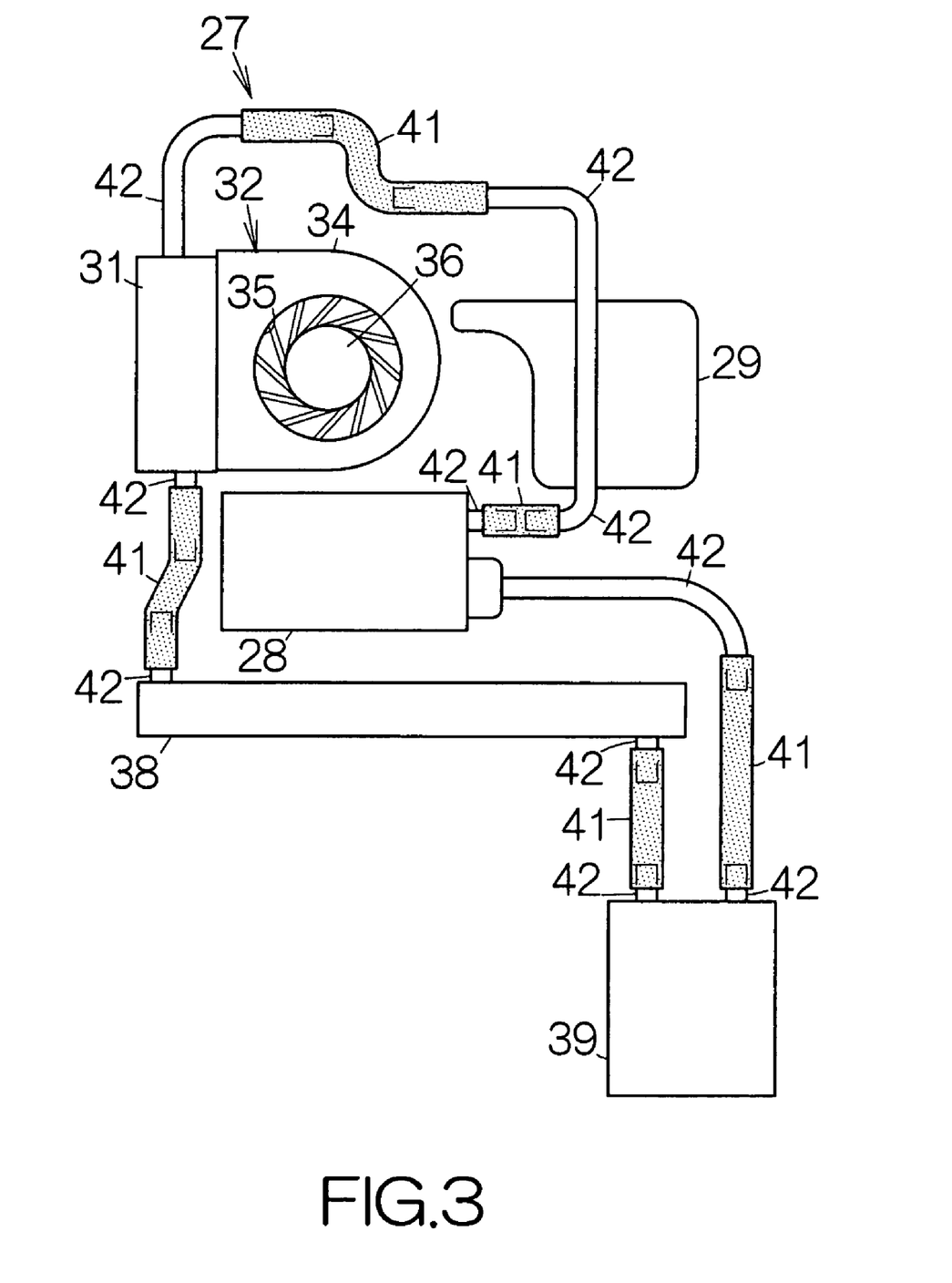
FIG. 3 is a plan view schematically depicting a liquid cooling unit.

As depicted in FIG. 3, a single elastic tube 41 is utilized for each connection between the first heat receiver 28 and the second heat receiver 29, between the second heat receiver 29 and the heat exchanger 31, between the heat exchanger 31 and the tank 38, between the tank 38 and the pump 39, and between the pump 39 and the first heat receiver 28. The opposite ends of the elastic tubes 41 receive the insertion of the tip ends of the metallic pipes, namely nipples 42, of the first heat receiver 28, the second heat receiver 29, the heat exchanger 31, the tank 38 and the pump 39, respectively. In this manner, the elastic tubes 41 are coupled to the nipples 42. The elastic tubes 41 and the nipples 42 are formed in the shape of a cylinder, for example.

The elastic tubes 41 may be made of an elastic resin material having flexibility, such as rubber, for example. The nipples 42 may be made of a metallic material having thermal conductivity, such as aluminum, for example. The elasticity of the elastic tubes 41 serves to absorb relative positional shifts between the first heat receiver 28, the second heat receiver 29, the heat exchanger 31, the tank 38 and the pump 39. The length of the respective elastic tubes 41 may be set minimum enough to accept the relative positional shifts. Decoupling of the elastic tubes 41 from the corresponding nipples 42 allows independent replacement of the first heat receiver 28, the second heat receiver 29, the heat exchanger 31, the tank 38 and the pump 39 in a relatively facilitated manner.

Figure 4:
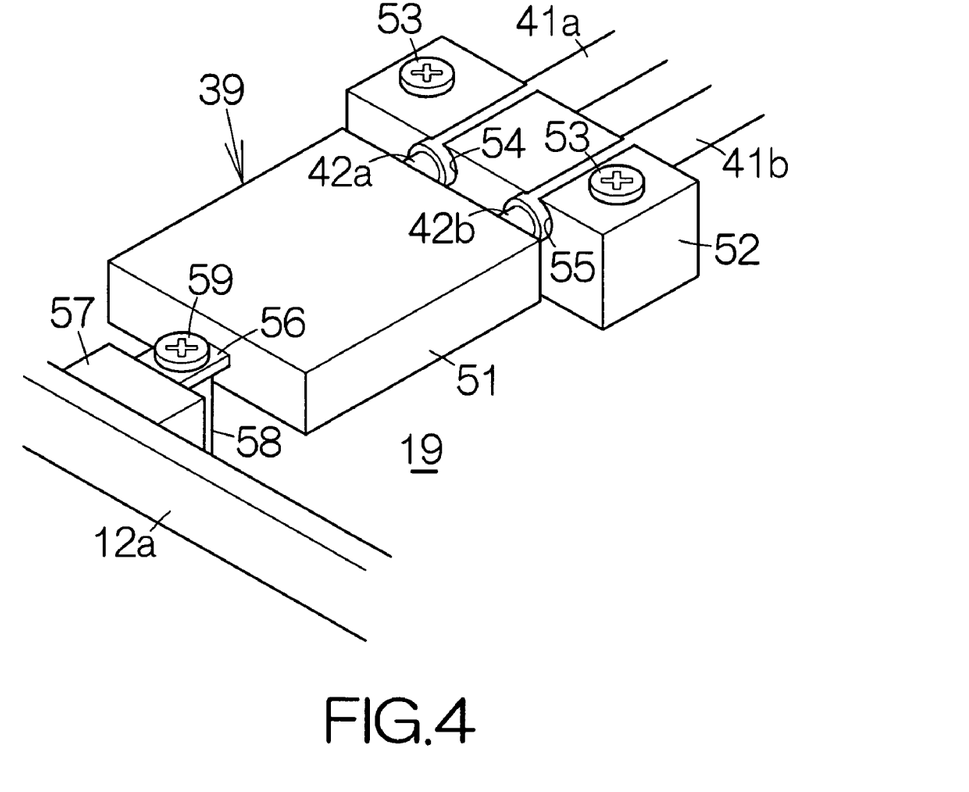
FIG. 4 is an enlarged partial perspective view schematically depicting a liquid cooling unit according to a first specific example.

As depicted in FIG. 4, the pump 39 includes a box-shaped pump body 51, for example. The pump body 51 is made of a resin material such as a polyphenylene sulfide (PPS) resin, for example. The PPS resin has a relatively low moisture permeability. An inflow nipple 42a and an outflow nipple 42b are defined in the front end of the pump body 51. The nipples 42a, 42b protrude from the front end of the pump body 51 in parallel with each other. The inflow nipple 42a defines an inflow passage for coolant. The outflow nipple 42b defines an outflow passage for coolant. A first elastic tube 41a is coupled to the inflow nipple 42a. The tip end of the inflow nipple 42a is received in the first elastic tube 41a. The second elastic tube 41b is coupled to the outflow nipple 42b. The tip end of the outflow nipple 42b is received in the second elastic tube 41b.

A fixation member 52 of a rectangular parallelepiped, for example, is located in front of the pump body 51. Screws 53 are utilized to fix the fixation member 52 on the front surface of the printed wiring board 19, for example. The fixation member 52 is made of any one of rubber-based, resin-based and asphalt-based vibration damping materials or vibration insulating materials, for example. Here, the fixation member 52' may be made of a vibration insulating rubber such as "HANENAITO®" distributed from Naigai Rubber Industry Co., Ltd., or an urethane foam such as "PORON®" distributed from Rogers Inoac Corporation, for example. Alternatively, the fixation member 52 may be made of a metallic material having a superior damping effect, such as magnesium alloy. A first groove 54 and a second groove 55 are defined in the front surface of the fixation member 52. The first groove 54 and the second groove 55 extend in parallel with each other. The first elastic tube 41a is received in the first groove 54. The second elastic tube 41b is received in the second groove 55.

Figure 5:
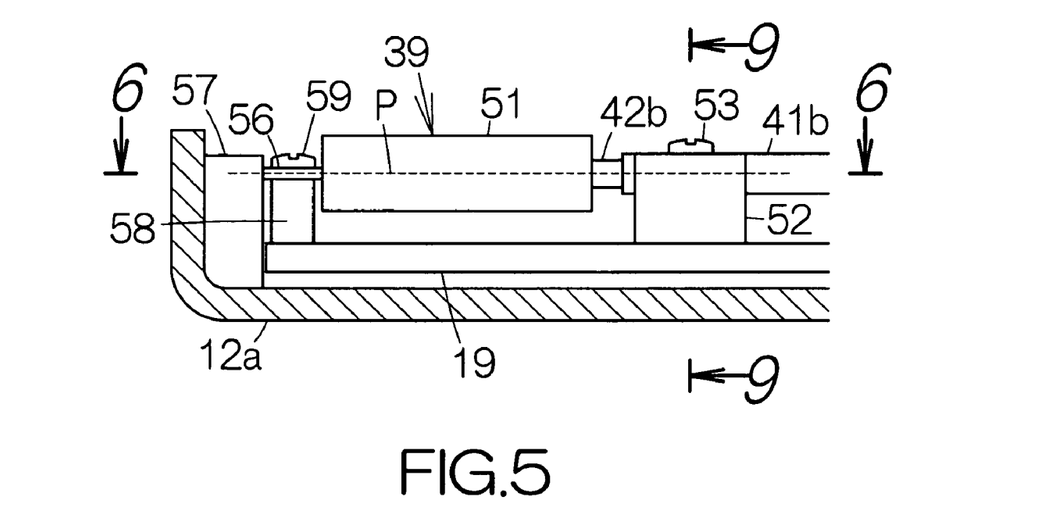
FIG. 5 is an enlarged partial sectional view schematically depicting the liquid cooling unit.

A plate-shaped attachment piece 56 is defined in the rear end of the pump body 51. The pump body 51 is interposed between the attachment piece 56 and the inflow and outflow nipples 42a, 42b. Referring also to FIG. 5, the attachment piece 56 extends along an imaginary plane P including the longitudinal axes of the inflow nipple 42a and the outflow nipple 42b. The tip end of the attachment piece 56 is held against a first support piece 57 along the imaginary plane P. The first support piece 57 is thus configured to hold the pump body 51 and the attachment piece 56 between the first support piece 57 itself and the inflow and outflow nipples 42a, 42b along the imaginary plane P. The first support piece 57 is attached on the inner wall surface of the base 12a. The first support piece 57 is an elastic body, for example.

The attachment piece 56 is received on a columnar second support piece 58 standing upright from the front surface of the printed wiring board 19, for example. The second support piece 58 supports the attachment piece 56 in the direction perpendicular to the imaginary plane P. The second support piece 58 is set stationary to the front surface of the printed wiring board 19. A screw 59 is utilized to fix the attachment piece 56 to the second support piece 58, for example. The screw 59 is configured to penetrate through a through opening defined in the attachment piece 56. The screw 59 is screwed into the second support piece 58. A predetermined clearance is established between the shaft of the screw 59 and the edge of the attachment piece 56 defining the through opening. As a result, the second support piece 58 enables the movement of the attachment piece 56 along the imaginary plane P. The second support piece 58 is an elastic body, for example.

As depicted in FIG. 5, the pump body 51 is supported on the fixation member 52 at the inflow nipple 42a and the outflow nipple 42b. Likewise, the pump body 51 is supported on the second support piece 58 at the attachment piece 56. As a result, the bottom surface of the pump body 51 is located at a predetermined level above the front surface of the printed wiring board 19. In this manner, the bottom surface of the pump body 51 is opposed to the front surface of the printed wiring board 19 at a predetermined interval. The pump body 51 and the printed wiring board 19 are thus prevented from contacting with each other.

Figure 6:
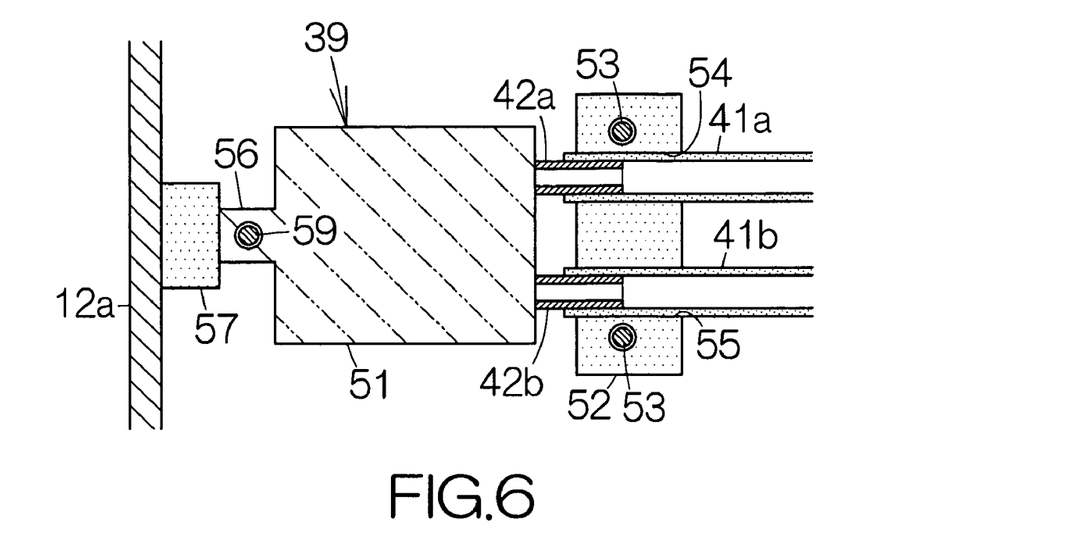
FIG. 6 is a sectional view taken along the line 6-6 in FIG. 5.

As depicted in FIG. 6, the first groove 54 receives the first elastic tube 41a alone ahead of the tip end of the inflow nipple 42a over a predetermined length from the tip end of the inflow nipple 42a. The first groove 54 supports the inflow nipple 42a inside the first elastic tube 41a over a predetermined length from the tip end of the inflow nipple 42a. The first elastic tube 41a may protrude out of the first groove 54 toward the supported end of the inflow nipple 42a by a predetermined length. Likewise, the second groove 55 receives the second elastic tube 41b alone ahead of the tip end of the outflow nipple 42b over a predetermined length from the tip end of the outflow nipple 42b. The second groove 55 supports the outflow nipple 42b inside the second elastic tube 41b over a predetermined length from the tip end of the outflow nipple 42b. The second elastic tube 41b protrudes out of the second groove 55 toward the supported end of the outflow nipple 42b by a predetermined length.

Figure 7:
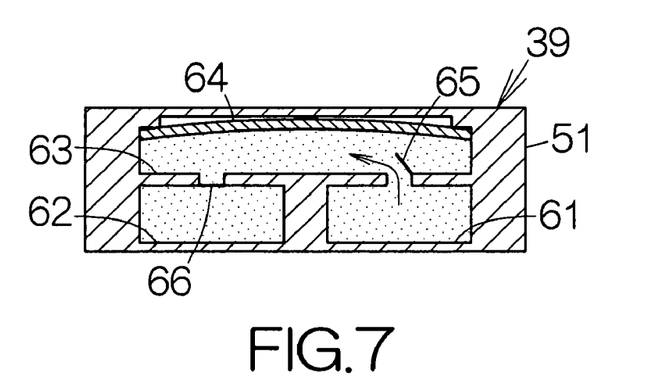
FIG. 7 is a sectional view schematically depicting the inner structure of a pump.

As depicted in FIG. 7, an inflow passage 61 and an outflow passage 62 are defined in the pump body 51 of the pump 39. The inflow nipple 42a is connected to the inflow passage 61. The outflow nipple 42b is connected to the outflow passage 62. A pump chamber 63 is connected to the inflow passage 61 and the outflow passage 62. A piezoelectric element 64 is placed in the pump chamber 63. A check valve 65 is interposed between the inflow passage 61 and the pump chamber 63. The check valve 65 is configured to permit only the flow of the coolant from the inflow passage 61 to the pump chamber 63. Likewise, a check valve 66 is interposed between the pump chamber 63 and the outflow passage 62. The check valve 66 is configured to permit only the flow of the coolant from the pump chamber 63 to the outflow passage 62.

When an electric field is applied to the piezoelectric element 64, the piezoelectric element 64 periodically vibrates. The vibration generates bending of the piezoelectric element 64. As depicted in FIG. 7, for example, when the piezoelectric element 64 swells toward the top plate of the pump body 51, a negative pressure is generated in the pump chamber 63. The coolant is thus forced to flow into the pump chamber 63 from the inflow passage 61. Since the check valve 66 is configured to permit only the flow of the coolant from the pump chamber 63 to the outflow passage 62, the coolant is prevented from flowing backward from the outflow passage 62 to the pump chamber 63. In this manner, the coolant is supplied to the pump 39 from the tank 38.

Figure 8:
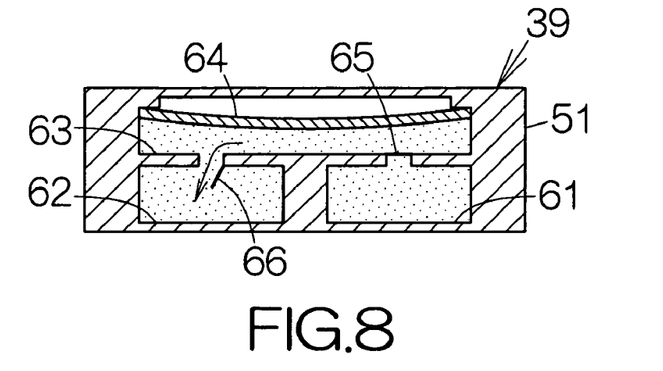
FIG. 8 is a sectional view schematically depicting the inner structure of the pump.

As depicted in FIG. 8, for example, when the piezoelectric element 64 swells toward the bottom plate of the pump body 51, a positive pressure is generated in the pump chamber 63. The coolant is thus forced to flow into the outflow passage 62 from the pump chamber 63. Since the check valve 65 is configured to permit only the flow of the coolant from the inflow passage 61 to the pump chamber 63, the coolant is prevented from flowing backward from the pump chamber 63 to the inflow passage 61. In this manner, the coolant is discharged from the pump 39 toward the first heat receiver 28.

Figure 9:
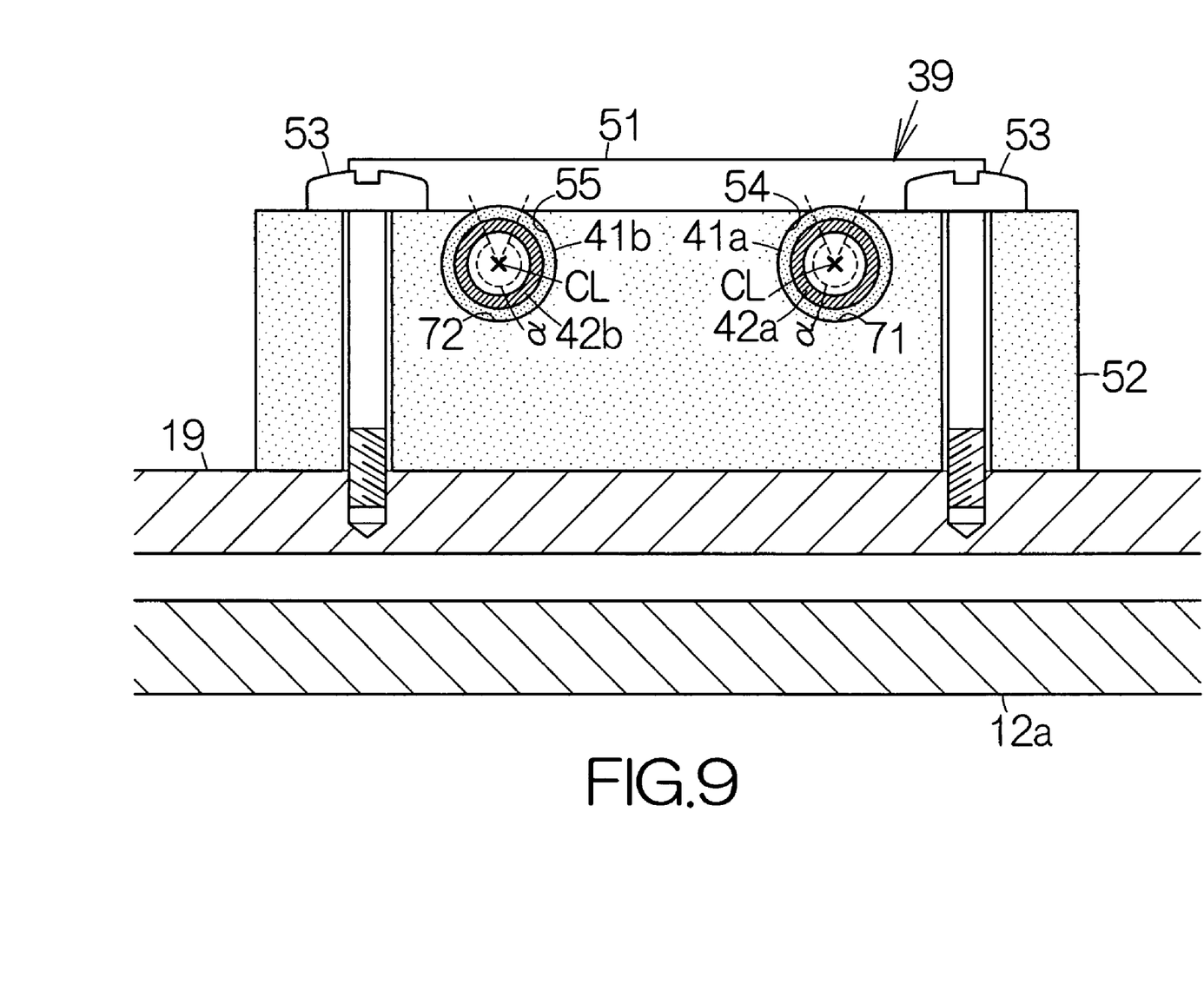
FIG. 9 is a sectional view taken along the line 9-9 in FIG. 5.

As depicted in FIG. 9, the fixation member 52 has a first curved surface 71 for defining the first groove 54 and a second curved surface 72 for defining the second groove 55. The first and second grooves 54, 55 form a space having a cylindrical surface and a rectangular flat surface having parallel edges on generatrices of a right circular cylinder having the cylindrical surface. The central angle α is set larger than 180 degrees and smaller than 360 degrees between the generatrices around the central axis CL of the right circular cylinder. In other words, the first and second grooves 54, 55 form a space having a cylindrical surface describing a partial circular contour within a cross-section perpendicular to the central axis CL of the cylindrical surface. The partial circular contour extends within the range of the central angle α larger than 180 degrees and smaller than 360 degrees. The first elastic tube 41a is tightly fitted into the first groove 54. Likewise, the second elastic tube 41b is tightly fitted into the second groove 55. A contact pressure is thus applied to the outer peripheral surface of the first elastic tube 41a from the first curved surface 71. Likewise, a contact pressure is applied to the outer peripheral surface of the second elastic tube 41b from the second cylindrical surface 72. In this manner, the first groove 54 and the second groove 55 are allowed to firmly hold the first elastic tube 41a and the second elastic tube 41b, respectively.

Now, assume that coolant circulates in the closed circulating loop. When the notebook personal computer 11 is switched on, the CPU chip instructs the fan unit 32 to operate. The fan 36 is driven to rotate. Fresh air is introduced into the main body enclosure 12 through an air inlet, not depicted, formed in the main body enclosure 12. The air is sucked into the fan housing 34 in parallel with the rotation axis of the fan 36 through the air suction openings 35. The fan 36 serves to generate airflow running along the front and back surfaces of the printed wiring board 19. Simultaneously, the CPU chip instructs the pump 39 to operate. The pump 39 discharges the coolant through the outflow nipple 42b in response to the oscillating motion of the piezoelectric element 64. In this manner, the coolant is forced to flow in the closed circulation loop.

The CPU chip generates heat during operation. The heat of the CPU chip is transferred to the first heat receiver 28. The coolant inside the flow passage absorbs the heat of the first heat receiver 28. The CPU chip is thus cooled. The coolant is forced to flow from the first heat receiver 28 to the second heat receiver 29. The video chip generates heat during operation. The heat of the video chip is transferred to the thermal conductive plate of the second heat receiver 29. The coolant inside the nipples 42 absorbs the heat of the thermal conductive plate. The video chip is thus cooled. The coolant is forced to flow from the second heat receiver 29 to the heat exchanger 31.

The coolant is allowed to flow into the heat exchanger 31. The heat of the coolant is transferred to the parallel heat radiating fins. The fan unit 32 generates airflow running from the ventilation opening 37 toward the air outlet 33. The heat of the coolant is radiated into the air from the surfaces of the parallel heat radiating fins. The coolant is thus cooled. The airflow is discharged out of the main body enclosure 12 through the air outlet 33. The coolant is allowed to flow into the tank 38. The coolant is then allowed to flow to the pump 39 from the tank 38. The pump 39 discharges the coolant from the outflow nipple 42b in response to the oscillating motion of the piezoelectric element 64. In this manner, the coolant is forced to continuously circulate.

The notebook personal computer 11 allows the pump 39 to discharge the coolant from the outflow nipple 42b in response to the oscillating motion of the piezoelectric element 64. Pulsation occurs in the pump 39. The first elastic tube 41a alone is received in the first groove 54 of the fixation member 52, while the second elastic tube 41b alone is received in the second groove 55 of the fixation member 52. The contact pressure acts on the first elastic tube 41a and the second elastic tube 41b from the fixation member 52. As a result, the first elastic tube 41a and the second elastic tube 41b are prevented from vibrating. This results in prevention of expansion of vibrations caused in the pump 39. Without a fixation member, the pulsation induces vibrations of the first elastic tube 41a and the second elastic tube 41b.

In addition, the pump body 51 includes the attachment piece 56 received on the first support piece 57. The attachment piece 56 is also supported on the second support piece 58 in the direction perpendicular to the imaginary plane P. The second support piece 58 allows the movement of the attachment piece 56 along the imaginary pane P. Even if the pump body 51 vibrates in response to the pulsation in the pump body 51, the vibrations are transferred to the first support piece 57 through the attachment piece 56. The first support piece 57 absorbs the vibrations of the attachment piece 56. This results in avoidance of transfer of the vibrations to the printed wiring board 19 and the base 12a. The vibrations of the pump 39 are in this manner prevented from expansion to the utmost.

Figure 10:
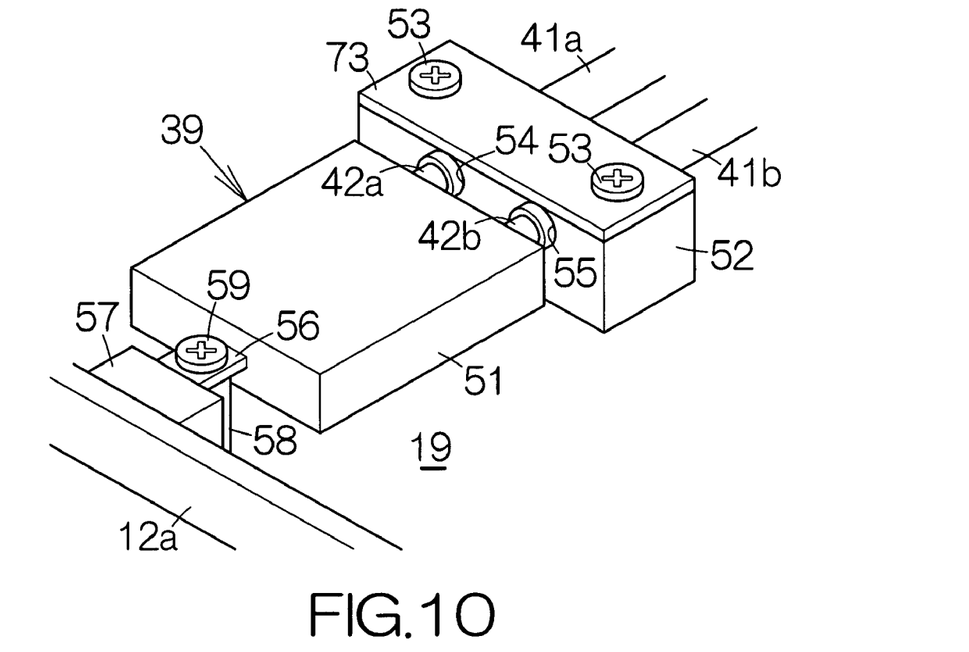
FIG. 10 is an enlarged partial perspective view schematically depicting a liquid cooling unit according to a second specific example.

As depicted in FIG. 10, the liquid cooling unit 27 may also include a plate-shaped urging member 73 overlaid on the front surface of the fixation member 52. The urging member 73 is made of a metallic plate, for example. The urging member 73 closes the openings of the first groove 54 and second groove 55. When the screws 53 are screwed, the urging member 73 urges the first elastic tube 41a and the second elastic tube 41b against the bottoms of the first groove 54 and the second groove 55, respectively. A larger contact pressure is established to hold the first elastic tube 41a and the second elastic tube 41b on the fixation member 52. The vibrations of the pump 39 are thus prevented from expanding to the utmost. Like reference numerals are attached to the structure or components equivalent to those of the aforementioned embodiment.

Figure 11:
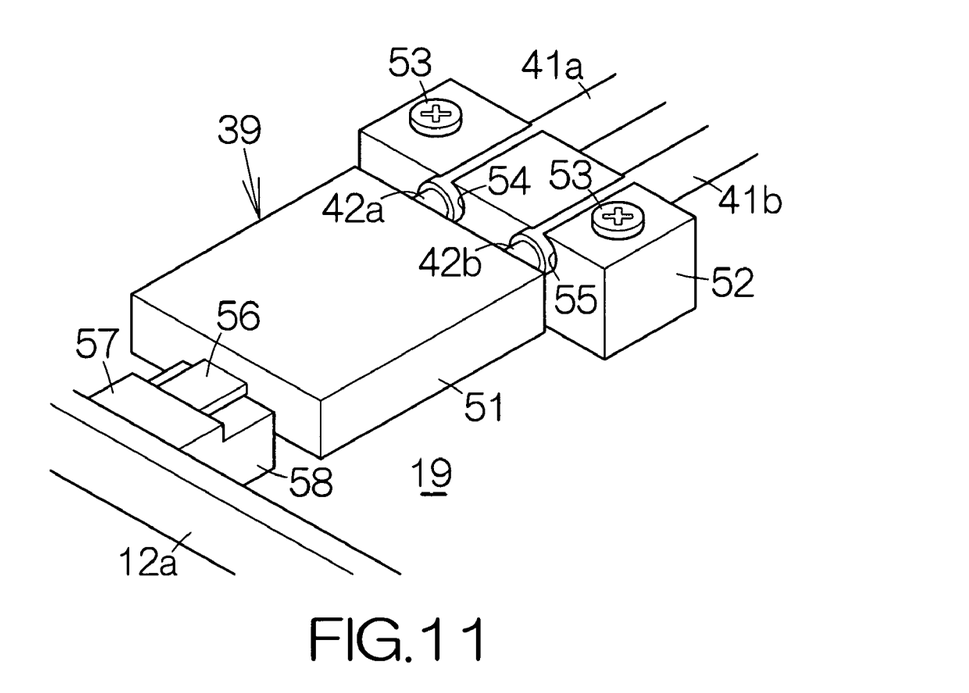
FIG. 11 is an enlarged partial perspective view schematically depicting a liquid cooling unit according to a third specific example.
Figure 12:
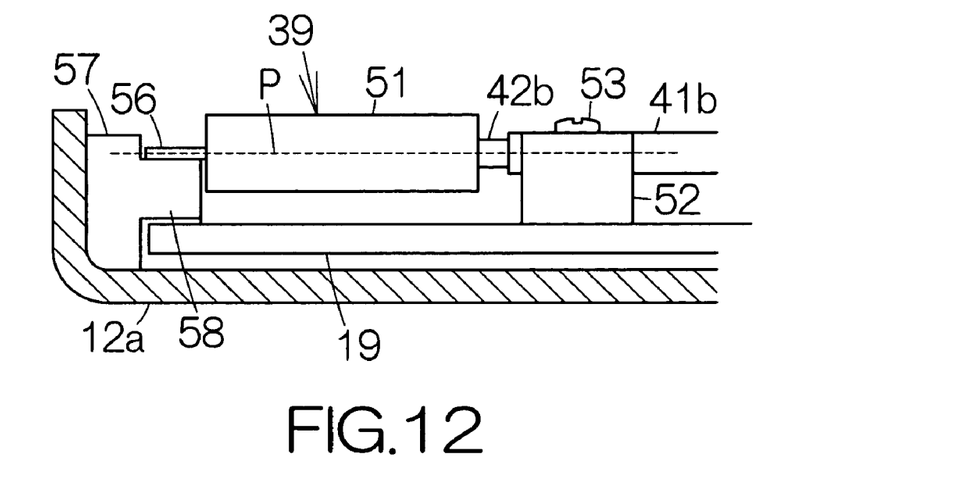
FIG. 12 is a partial sectional view schematically depicting the liquid cooling unit according to the third specific example.

As depicted in FIG. 11, the screw 59 may be omitted in the liquid cooling unit 27. As depicted in FIG. 12, the second support piece 58 receives the attachment piece 56. The second support piece 58 is interposed between the pump body 51 and the first support piece 57. In this manner, the pump body 51 is received on the second support piece 58. Here, the second support piece 58 may be formed integral with the first support piece 57. Like reference numerals are attached to the structure or components equivalent to those of the aforementioned embodiments. The liquid cooling unit 27 allows transfer of vibrations of the pump body 51 to the first support piece 57 and the second support piece 58 through the attachment piece 56, even if the vibrations are induced as a result of the pulsation in the pump body 51. The first support piece 57 and the second support piece 58 serve to absorb the vibrations. This results in avoidance of transfer of the vibrations to the printed wiring board 19 and the base 12a. The vibrations of the pump 39 are prevented from expanding to the utmost.

Figure 13:
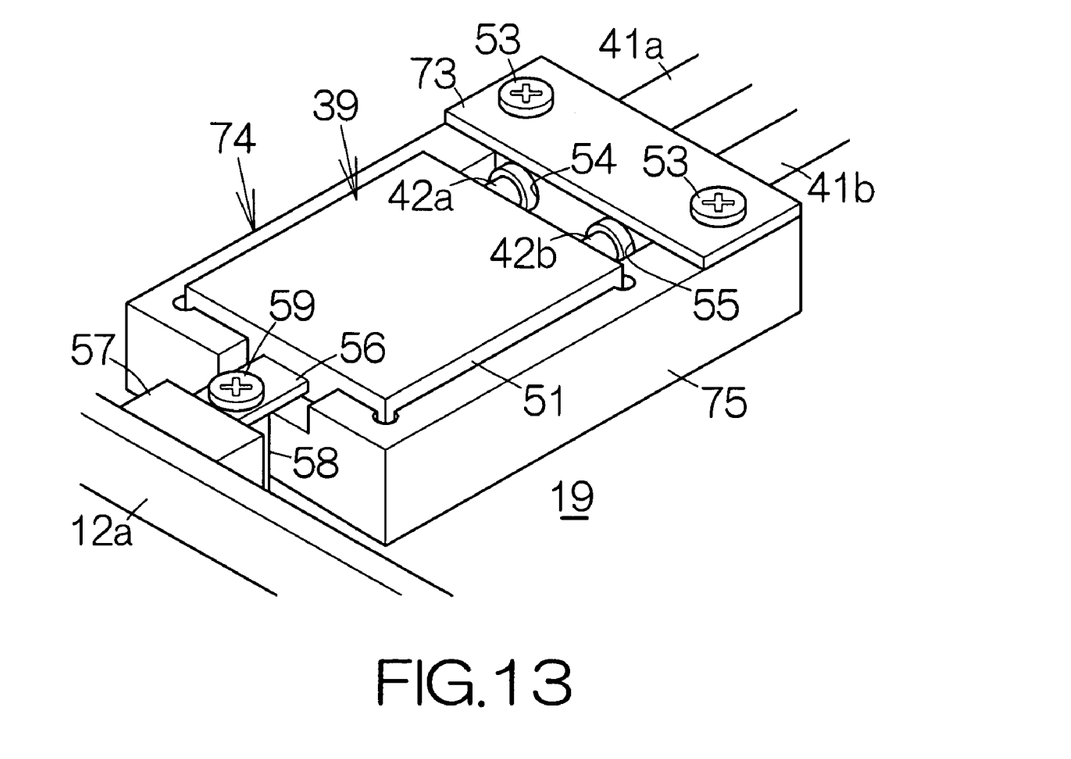
FIG. 13 is an enlarged partial perspective view schematically depicting a liquid cooling unit according to a fourth specific example.
Figure 14:
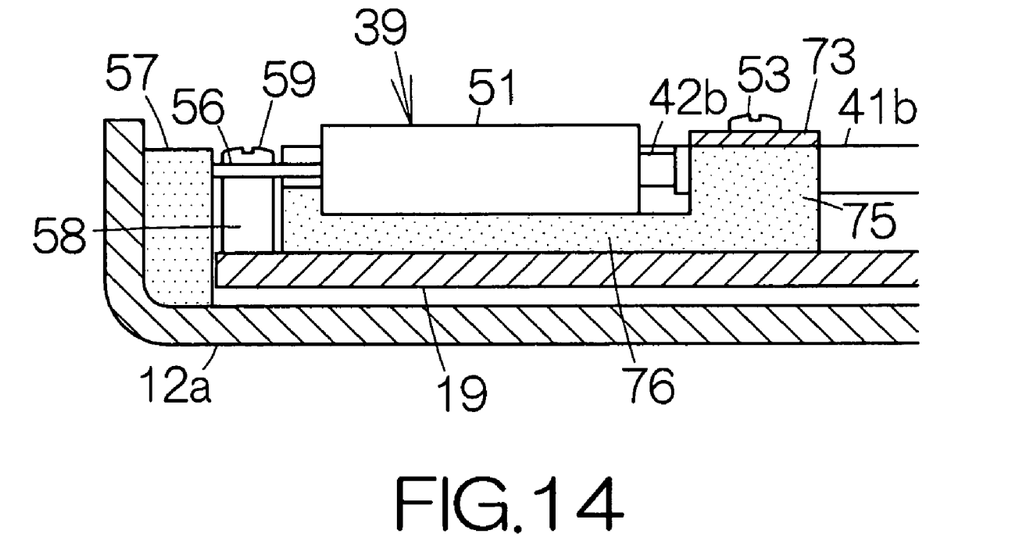
FIG. 14 is an enlarged partial sectional view schematically depicting the liquid cooling unit according to the fourth specific example.

As depicted in FIG. 13, the liquid cooling unit 27 may include a fixation member 74 incorporated therein in place of the fixation member 52. The fixation member 74 defines a surrounding wall 75 endlessly surrounding the pump body 51. The first groove 54 and the second groove 55 are defined in one of the sides of the surrounding wall 75. Referring also to FIG. 14, the surrounding wall 75 stands upright from the surface of a bottom plate 76 opposed to the bottom surface of the pump body 51. The surrounding wall 75 and the bottom plate 76 in combination form a vessel. The pump body 51 is contained in the vessel. The bottom plate 76 is received on the front surface of the printed wiring board 19. The fixation member 74 is made of a vibration insulating rubber in the same manner as described above. Like reference numerals are attached to the structure or components equivalent to those of the aforementioned embodiments.

Even if the coolant leaks through an interface between the inflow nipple 42a and the first elastic tube 41a or between the outflow nipple 42b and the second elastic tube 41b, the coolant drops on the bottom plate 76 of the fixation member 74. The surrounding wall 75 serves to dam the coolant inside the fixation member 74. The coolant is prevented from dropping out of the fixation member 74 onto the front surface of the printed wiring board 19. This results in avoidance of a short circuit between electronic components and wiring patterns on the printed wiring board 19, for example. The notebook personal computer 11 is prevented from malfunctioning to the utmost.

All examples and conditional language recited herein are intended for pedagogical purposes to aid the reader in understanding the invention and the concept contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A liquid cooling unit comprising:
a pump body containing a reciprocating component of a reciprocating pump;
a nipple formed in the pump body, the nipple defining an outflow passage for coolant;
an elastic tube having a tip end receiving insertion of the nipple so that the elastic tube is coupled to the nipple;
a fixation member defining a groove supporting the nipple inside the elastic tube over a first predetermined length from a tip end of the nipple, the groove receiving the elastic tube alone ahead of the tip end of the nipple over a second predetermined length from the tip end of the nipple;
an urging member overlaid on the fixation member to close the groove, the urging member urging the elastic tube against a bottom of the groove,
an attachment piece located on a first side of the pump body, configured to hold the pump body and the attachment piece itself along an imaginary plane which is between and parallel to top and bottom surfaces of the pump body and which includes a longitudinal axis of the nipple which is located on an opposite second side of the pump body;
a first support piece located on the first side of the pump body configured to hold the pump body, the attachment piece and the first support piece itself on the first side of the pump body and along the imaginary plane; and
a second support piece located on the first side of the pump body supporting the attachment piece on the first side of the pump body in a direction perpendicular to the imaginary plane, allowing movement of the attachment piece along the imaginary plane, wherein
a part of the elastic tube in a circumferential direction within the first predetermined length is held between the nipple and the fixation member and another part of the elastic tube in the circumferential direction within the first predetermined length is held between the nipple and the urging member.

2. The liquid cooling unit according to claim 1, wherein the groove forms a space having a cylindrical surface describing a partial circular contour within a cross-section perpendicular to an axis of the cylindrical surface, the partial circular contour extending within a range of a central angle larger than 180 degrees and smaller than 360 degrees.

3. The liquid cooling unit according to claim 2, wherein the elastic tube is tightly fitted in the groove.

4. The liquid cooling unit according to claim 1, wherein the fixation member is made of at least one of a vibration insulating material and a vibration damping material.

5. A liquid cooling unit comprising:
a pump body containing a reciprocating component of a reciprocating pump;
an inflow nipple formed in the pump body, the inflow nipple defining an inflow passage for coolant;
an outflow nipple formed in the pump body in parallel with the inflow nipple, the outflow nipple defining an outflow passage for coolant;
a first elastic tube having a tip end receiving insertion of the inflow nipple so that the first elastic tube is coupled to the inflow nipple;

a second elastic tube having a tip end receiving insertion of the outflow nipple so that the second elastic tube is coupled to the outflow nipple;

a fixation member defining a first groove and a second groove, the first groove supporting the inflow nipple inside the first elastic tube over a first predetermined length from a tip end of the inflow nipple, the first groove receiving the first elastic tube alone ahead of the tip end of the inflow nipple over a second predetermined length from the tip end of the inflow nipple, the second groove supporting the outflow nipple inside the second elastic tube over a third predetermined length from a tip end of the outflow nipple, the second groove receiving the second elastic tube alone ahead of the tip end of the outflow nipple over a fourth predetermined length from the tip end of the outflow nipple;

an urging member overlaid on the fixation member to close the first groove and the second groove, the urging member urging the first elastic tube and the second elastic tube against a bottom of the first groove and a bottom of the second groove, respectively, an attachment piece located on a first side of the pump body, configured to hold the pump body between the inflow and outflow nipples which are located on an opposite second side of the pump body, and the attachment piece itself along an imaginary plane including longitudinal axes of the inflow and outflow nipples;

a first support piece located on the first side of the pump body configured to hold the pump body, the attachment piece between the inflow and outflow nipples and the first support piece itself on the first side of the pump body and along the imaginary plane; and a second support piece located on the first side of the pump body supporting the attachment piece on the first side of the pump body in a direction perpendicular to the imaginary plane, allowing movement of the attachment piece along the imaginary plane, wherein a part of the first elastic tube in a circumferential direction within the first predetermined length is held between the inflow nipple and the fixation member and another part of the first elastic tube in the circumferential direction within the first predetermined length is held between the inflow nipple and the urging member, and a part of the second elastic tube in a circumferential direction within the third predetermined length is held between the outflow nipple and the fixation member and another part of the second elastic tube in the circumferential direction within the third predetermined length is held between the outflow nipple and the urging member.

6. The liquid cooling unit according to claim 5, wherein the first and second grooves each form a space having a cylindrical surface describing a partial circular contour within a cross-section perpendicular to an axis of the cylindrical surface, the partial circular contour extending within a range of a central angle larger than 180 degrees and smaller than 360 degrees.

7. The liquid cooling unit according to claim 6, wherein the first elastic tube and the second elastic tube are tightly fitted in the first groove and the second groove, respectively.

8. The liquid cooling unit according to claim 5, wherein the fixation member is made of at least one of a vibration insulating material and a vibration damping material.

9. The liquid cooling unit according to claim 5, wherein the first support piece is an elastic body.

10. The liquid cooling unit according to claim 5, wherein the fixation member includes:

a bottom plate opposed to a bottom surface of the pump body; and a surrounding wall standing upright from a surface of the bottom plate, the surrounding wall endlessly surrounding the pump body to form a vessel in combination with the bottom plate.

11. An electronic apparatus comprising:
an enclosure;
an electronic component enclosed in the enclosure; and
a liquid cooling unit associated with the electronic component within the enclosure, wherein
the liquid cooling unit includes:
a pump body containing a reciprocating component of a reciprocating pump;
a nipple formed in the pump body, the nipple defining an outflow passage for coolant;
an elastic tube having a tip end receiving insertion of the nipple so that the elastic tube is coupled to the nipple;
a fixation member defining a groove supporting the nipple inside the elastic tube over a first predetermined length from a tip end of the nipple, the groove receiving the elastic tube alone ahead of the tip end of the nipple over a second predetermined length from the tip end of the nipple;
an urging member overlaid on the fixation member to close the groove, the urging member urging the elastic tube against a bottom of the groove,
an attachment piece located on a first side of the pump body, configured to hold the pump body and the attachment piece itself along an imaginary plane which is between and parallel to top and bottom surfaces of the pump body and which includes a longitudinal axis of the nipple which is located on an opposite second side of the pump body;
a first support piece located on the first side of the pump body configured to hold the pump body, the attachment piece and the first support piece itself on the first side of the pump body and along the imaginary plane; and
a second support piece located on the first side of the pump body supporting the attachment piece on the first side of the pump body in a direction perpendicular to the imaginary plane, allowing movement of the attachment piece along the imaginary plane, wherein
a part of the elastic tube in a circumferential direction within the first predetermined length is held between the nipple and the fixation member and another part of the elastic tube in the circumferential direction within the first predetermined length is held between the nipple and the urging member.

12. The electronic apparatus according to claim 11, wherein the groove forms a space having a cylindrical surface describing a partial circular contour within a cross-section perpendicular to an axis of the cylindrical surface, the partial circular contour extending within a range of a central angle larger than 180 degrees and smaller than 360 degrees.

13. The electronic apparatus according to claim 12, wherein the elastic tube is tightly fitted in the groove.

14. The electronic apparatus according to claim 11, wherein the fixation member is made of at least one of a vibration insulating material and a vibration damping material.

15. An electronic apparatus comprising:
an enclosure;
an electronic component enclosed in the enclosure; and
a liquid cooling unit associated with the electronic component within the enclosure, wherein
the liquid cooling unit includes:

a pump body containing a reciprocating component of a reciprocating pump;

an inflow nipple formed in the pump body, the inflow nipple defining an inflow passage for coolant;

an outflow nipple formed in the pump body in parallel with the inflow nipple, the outflow nipple defining an outflow passage for coolant;

a first elastic tube having a tip end receiving insertion of the inflow nipple so that the first elastic tube is coupled to the inflow nipple;

a second elastic tube having a tip end receiving insertion of the outflow nipple so that the second elastic tube is coupled to the outflow nipple;

a fixation member defining a first groove and a second groove, the first groove supporting the inflow nipple inside the first elastic tube over a first predetermined length from a tip end of the inflow nipple, the first groove receiving the first elastic tube alone ahead of the tip end of the inflow nipple over a second predetermined length from the tip end of the inflow nipple, the second groove supporting the outflow nipple inside the second elastic tube over a third predetermined length from a tip end of the outflow nipple, the second groove receiving the second elastic tube alone ahead of the tip end of the outflow nipple over a fourth predetermined length from the tip end of the outflow nipple;

an urging member overlaid on the fixation member to close the first groove and the second groove, the urging member urging the first elastic tube and the second elastic tube against a bottom of the first groove and a bottom of the second groove, respectively, an attachment piece located on a first side of the pump body, configured to hold the pump body between the inflow and outflow nipples which are located on an opposite second side of the pump body, and the attachment piece itself along an imaginary plane including longitudinal axes of the inflow and outflow nipples;

a first support piece located on the first side of the pump body configured to hold the pump body, the attachment piece between the inflow and outflow nipples and the first support piece itself on the first side of the pump body and along the imaginary plane; and a second support piece located on the first side of the pump body supporting the attachment piece on the first side of the pump body in a direction perpendicular to the imaginary plane, allowing movement of the attachment piece along the imaginary plane, wherein a part of the first elastic tube in a circumferential direction within the first predetermined length is held between the inflow nipple and the fixation member and another part of the first elastic tube in the circumferential direction within the first predetermined length is held between the inflow nipple and the urging member, and a part of the second elastic tube in a circumferential direction within the third predetermined length is held between the outflow nipple and the fixation member and another part of the second elastic tube in the circumferential direction within the third predetermined length is held between the outflow nipple and the urging member.

16. The electronic apparatus according to claim 15, wherein the first and second grooves each form a space having a cylindrical surface describing a partial circular contour within a cross-section perpendicular to an axis of the cylindrical surface, the partial circular contour extending within a range of a central angle larger than 180 degrees and smaller than 360 degrees.

17. The electronic apparatus according to claim 16, wherein the first elastic tube and the second elastic tube are tightly fitted in the first groove and the second groove, respectively.

18. The electronic apparatus according to claim 15, wherein the fixation member is made of at least one of a vibration insulating material and a vibration damping material.

19. The electronic apparatus according to claim 15, wherein the first support piece is an elastic body.

20. The electronic apparatus according to claim 15, wherein the fixation member includes:

a bottom plate opposed to a bottom surface of the pump body; and a surrounding wall standing upright from a surface of the bottom plate, the surrounding wall endlessly surrounding the pump body to form a vessel in combination with the bottom plate.

* * * * *